June 10, 1969 G. CARON 3,449,012
REAR SEATS OF VEHICLES
Filed Aug. 15, 1967
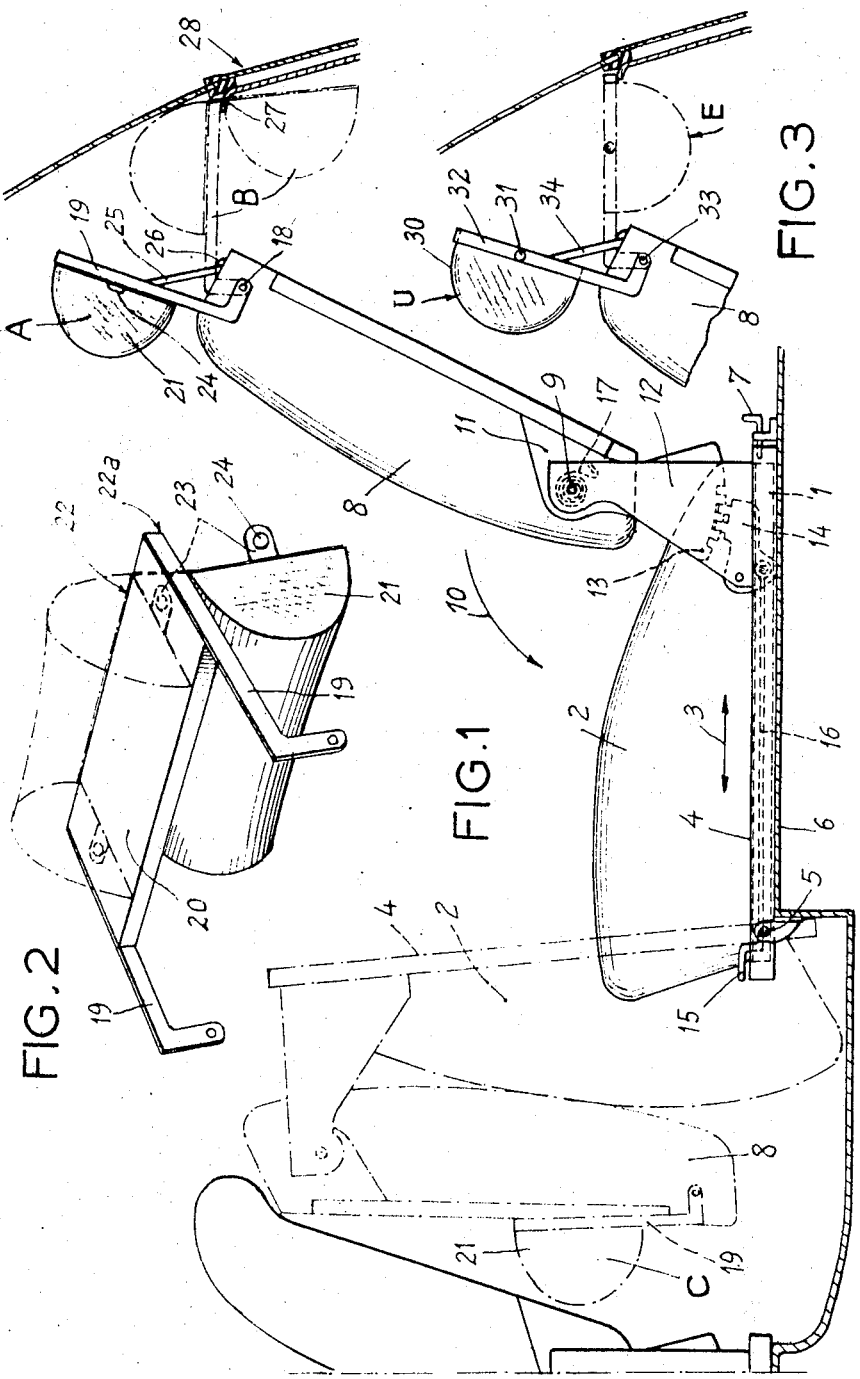
INVENTOR
GEORGES CARON
BY Stevens, Davis, Miller & Mosher
ATTORNEYS

United States Patent Office 3,449,012
Patented June 10, 1969

3,449,012
REAR SEATS OF VEHICLES
Georges Caron, Billancourt, France, assignor to Regie Nationale des Usines Renault, Billancourt, France, and Societe Industrielle et Commerciale des Automobiles Peugeot, Paris, France
Filed Aug. 15, 1967, Ser. No. 660,651
Claims priority, application France, Sept. 16, 1966, 76,637
Int. Cl. A47c 1/10, 7/36; B60n 1/02
U.S. Cl. 297—403     5 Claims

ABSTRACT OF THE DISCLOSURE

A rear seat of a vehicle, characterised in that its back is provided at its upper portion with a headrest support pivotally mounted and adjustable for variable inclination in the fore-and-aft direction in relation to the seat and that said headrest is retractably mounted at the rear of said support whereby the assembly can be used at will as a headrest or a rear tray, or alternately be retracted completely behind the seat.

---

This invention relates to the rear seats of automobile vehicles, for example of the individual type, whether partially or completely separated, or of the bench type.

This invention is concerned more particularly with a rear seat of vehicle which is characterised essentially in that its back or squab is provided at its upper portion with a hinged and adjustable headrest support, and that the headrest is retractably mounted at the rear of said support, whereby the assembly can be used at will as a headrest or as a rear tray, or alternately retracted completely behind the seat.

Moreover, as this invention is applicable to an adjustable seat having a reclining cushion and adapted to slide on slideways pivotally connected at their front ends to the floor of the vehicle, it is possible, after the aforesaid tray and headrest have been folded back behind the back, to fold up this seat into a compact assembly and to tilt it forwards, thus freeing a considerable additional luggage space complementing the normal trunk space at the rear of the vehicle.

A typical form of embodiment of this invention is illustrated diagrammatically by way of example in the attached drawing, in which:

FIGURE 1 is a side elevational view showing the seat in its different positions;

FIGURE 2 shows the tray and the headrest assembly in its retracted position, and FIGURE 3 illustrates another possible arrangement of the tray and headrest assembly.

Referring first to FIGURE 1 of the drawing it will be seen that the rear seat of vehicle according to this invention comprises a back or back 8 and a cushion 2 supported by a seat frame 1 adapted to slide in the direction of the arrows 3 on slideways 4. These slideways are hingedly mounted at their front end on the floor 6 of the vehicle and locked at their rear end, in relation to said floor, by a detachable pin 7 or any other equivalent and suitable means.

The back 8 is constantly urged by a spiral spring 17 towards the cushion 2 (see arrow 10) and is pivotally mounted on the frame 1 for example by means of a pivot pin 9 and intermediate brackets or gussets 11 and 12, and adapted to be locked in any desired intermediate position by means of a suitable device consisting preferably of a toothed locking pawl or catch 14 pivoted to the frame 1 and adapted to engage a toothed sector 13 rigid with one of the brackets or gussets 11. A hand lever 15 is fitted for actuating the toothed pawl 14 from the front of the seat through a coupling rod 16, thus releasing the squab 8.

Pivotally mounted on the upper portion of back 8 by means of pivot pins 18 and preferably on either side thereof is an arm 19 rigid with a tray 20 (FIGURE 2) supporting a headrest 21 adapted to be locked in the position shown in thick lines, for example by means of a strap 25. This strap 25 is pivotally mounted on the upper portion of the back or, if desired, on the tray 20, in order to hold this tray 20 in the desired adjustment position in conjunction, for example, with notches (not shown) formed in the top portion of the back or in the lower face of said tray.

As illustrated in FIGURES 1 and 2 of the drawing the headrest 21 is secured along one edge 22 of this tray 20 for example by means of a flexible, hinge-forming lug, and is adapted to depend freely (FIGURE 2, thick lines) or alternately to be secured to the upper face of said tray by means of rigid lugs 23 associated with dome-fasteners 24 or the like (FIGURE 2, dot-and-dash lines). This last case corresponds to the actual use of said headrest (position A, FIGURE 1) and the other case corresponds to the use of the tray (position B, FIGURE 1), after the readrest 21 has been retracted, the edge 22a of the tray then engaging a stop 27 rigid with the body or like fixed portion 28 of the vehicle.

Finally, the headrest may be folded against the back of the seat squab 8 (position C) notably when the complete seat is to be folded and tilted forwards (see dot-and-dash portion of FIGURE 1).

According to another possible arrangement of the retractable tray and headrest, as illustrated in FIGURE 3, the headrest 30 may be pivotally mounted about pivot pins 31 so located that the headrest can be moved by a half-revolution from its operative position U to its retracted or inoperative position E in which at least part of the back of the headrest constitutes a tray, this back constituting a complete tray or shelf when the headrest extends entirely between the supporting arms 32 pivotally mounted on the back 8 at 33 as in the preceding case; to this end, these arms coact directly with a strap 34 having a function similar to that of strap 25 of the preceding form of embodiment.

I claim:
1. A headrest for the rear seat of a vehicle comprising a headrest support pivotally and adjustably mounted on the upper portion of the back of said seat for variable inclination in the fore-and-aft direction in relation to the seat and a headrest retractably mounted at the rear of said support forming an assembly which can selectively be used as a headrest, rear tray, and be retracted completely behind the seat.

2. The headrest according to claim 1 in which said headrest is pivotally mounted in relation to said support so that it can be retracted completely by turning it through a half revolution thus causing the back of said headrest to serve as at least a portion of said rear tray.

3. The headrest according to claim 1 in which said support comprises at least a portion of said rear tray, at least one flexible connecting member retractably mounting said headrest in the vicinity of the rear edge of said support portion of said rear tray and serving as a hinge therefor.

4. The headrest according to claim 1 in which said support coacts with a stop member secured to the vehicle to obtain the rear tray position.

5. The headrest according to claim 1 in which said seat comprises a reclining back and seat cushion mounted on slideways, the front of said seat cushion being hingedly mounted on the floor of the vehicle whereby, when said tray and headrest have been retracted behind the back of the seat, the seat can be folded down and tilted forward in order to free additional space in the vehicle body.

References Cited

UNITED STATES PATENTS

| 2,926,948 | 3/1960 | Koplin et al. | 297—378 X |
| 3,170,725 | 2/1965 | Komorowski | 297—403 X |
| 3,174,799 | 2/1965 | Haltenberger | 297—403 |
| 3,186,763 | 6/1965 | Ferrara | 297—410 |

CASMIR A. NUNBERG, *Primary Examiner.*

U.S. Cl. X.R.

297—189, 378, 391